Patented Nov. 12, 1929

1,735,327

UNITED STATES PATENT OFFICE

STEWART JOSEPH LLOYD, OF UNIVERSITY, AND ABSALOM MASON KENNEDY, OF MONTGOMERY, ALABAMA, ASSIGNORS TO FEDERAL PHOSPHORUS COMPANY, OF BIRMINGHAM, ALABAMA, A CORPORATION OF ALABAMA

METHOD OF MAKING CARBOLIC ACID

No Drawing. Application filed March 21, 1925, Serial No. 17,429. Renewed October 28, 1926.

This invention relates to the manufacture of carbolic acid or phenol ($C_6H_5OH$), used largely as an antiseptic, in the manufacture of explosives and other chemicals and for the production of synthetic resins.

An object of the invention is the production of carbolic acid from benzol ($C_6H_6$) by first forming a benzol derivative and by the substitution, in the vapor phase by the use of steam in the presence of a heated catalyst, of an hydroxyl radical for the derivative element or radical.

The carbolic acid or phenol of commerce is at present produced essentially by three methods: (1) by extracting it from coal tar; (2) by a series of reactions in which benzol, in the liquid or vapor phase, is mixed with concentrated sulphuric acid and the product subjected to the action of lime, to fused caustic soda and to mineral acids; (3) by subjecting chlorbenzol or brombenzol to the action of caustic soda solution at high temperature under pressure.

The amount obtained by the first method is inadequate to supply the demand. The second method is essentially wasteful of the materials used and is expensive. The high pressure and temperature used in the third method make it undesirable.

It is well known that one or more of the hydrogen atoms of benzol may be replaced by other elements or radicals. For example, by familiar methods, benzol may be halogenated with chlorine or bromine to $C_6H_5Cl$, $C_6H_5Br$, etc., or by combination with various radicals, other benzol substitution derivatives such as $C_6H_5SH$, $C_6H_5SO_3H$, etc., may be formed. We have found that if one of these substituted benzol derivatives, such as chlorbenzol or brombenzol, in the vapor phase, together with steam, is passed through a porous, chemically resistant, heated material which acts as a catalyst, it is partially converted into carbolic acid by a reaction which may be represented as follows:—

$$C_6H_5Cl + H_2O \rightarrow C_6H_5OH + HCl$$
$$C_6H_5Br + H_2O \rightarrow C_6H_5OH + HBr$$

The phrase "chemically resistant" is used in the sense that the catalytic agent is chemically resistant to the reacting substances. The word "porous" is used to cover either the porosity of the individual grains or particles of the catalyst or the porosity of the aggregate mass of particles, as they may be loosely related to one another within the reacting chamber.

This reaction is not ordinarily completed in a single passage of the benzol derivative through the apparatus and the amount of carbolic acid produced seems to depend on the length of time the vapors are exposed to the heated catalyst. The unaltered chlorbenzol may be readily separated and again sent through the apparatus and by this means we have found that at least 90% of the benzol derivative may be recovered as its equivalent of pure carbolic acid.

We are aware that Meyer and Bergius in United States Patent No. 1,062,351, and (Aylesworth in United States Patent No. 1,213,142, produce phenol from chlorbenzol, and that Dow in United States Patent No. 1,274,394, produces it from brombenzol. In all of these methods, however, the reaction is carried on with the reagents in the liquid phase under high pressure, requiring special and costly apparatus to withstand the pressure strains, and the operation is somewhat dangerous. We have found that when the method herein described, in which the reagents are in the vapor phase, is used, the reaction takes place at atmospheric pressure so that simpler apparatus may be used and the danger due to the bursting of vessels or tubes or to the blowing out of packings, etc., is entirely eliminated.

We have found that the amount of steam used may vary considerably from the theoretical amount indicated, as of 18 parts of water 112.5 parts of chlorbenzol, without seriously affecting the reaction or the product; in fact, an excess of steam produces a greater yield than the theoretical proportion. We have found also that the yield may be increased by occasionally cutting off the supply of the benzol derivative vapor and thus sweeping out the catalyst with steam. This steam may be superheated, if desired, without seriously affecting the process or the product.

We have found that, when using chlorbenzol or brombenzol and steam, if the furnace is heated to about 700° centigrade, the reaction proceeds in a satisfactory manner and that a reasonable variation from this temperature may be permitted without seriously affecting the result. Higher temperatures tend to decompose the benzol compound and to deposit carbon on the catalyst more rapidly, while at lower temperatures, the reaction proceeds more slowly. At 700°, a deposit of carbon slowly accumulates on the heated catalyst. This may be removed by sending air through the furnace. Above 1200°, this carbon deposits so rapidly as to interfere with the action of the catalyst. No tarry or other liquid accumulations have been observed on the catalyst at temperatures lower than 1200°.

This reaction may be most conveniently carried out at atmospheric pressure but we have found that increased pressure does no harm. It is essential, however, that to obtain this reaction at atmospheric or low pressure, the benzol derivative and the water, in the presence of the heated catalyst, must be in the vapor phase.

As a typical means for carrying out the process we prefer to operate as follows: Through a closed vessel containing chlorbenzol, which may be the commercial or unrefined product, steam is passed in such a manner as to volatilize the proper proportion of the chlorbenzol. The combined vapors are passed through a furnace, heated by any suitable means to approximately 700°, containing bauxite, silica gel or other chemically resistant material in a very porous form.

The products of the furnace, consisting of a mixture of carbolic acid, hydrochloric acid, unaltered chlorbenzol and steam, all in the vapor phase, are cooled, when these constituents will condense and will separate into two layers, the one containing water, acidulated with hydrochloric acid and a portion of the carbolic acid, the other containing the unaltered chlorbenzol and the remainder of the carbolic acid.

This condensate is then mixed with caustic soda solution and is thoroughly agitated. On being allowed to settle it will separate into two layers, one containing a solution of sodium chloride and the carbolic acid as sodium phenate, the other consisting of unaltered chlorbenzol.

To the former is added an acid, preferably carbonic, when the carbolic acid will be liberated as indicated by the following reaction:

$$2NaC_6H_5O + H_2CO_3 \rightarrow Na_2CO_3 + 2C_6H_5OH.$$

The carbolic acid thus set free may be recovered by distillation. The unaltered chlorbenzol is collected and returned through the furnace.

By this means we have found it possible to recover 90% of the chlorbenzol used as its equivalent in pure carbolic acid.

We claim:—

1. A method of making carbolic acid, consisting in vaporizing a monohalogen derivative of benzol and passing same in a vapor phase with steam through a catalyst comprised of silica gel.

2. A method of making carbolic acid, consisting of vaporizing a monohalogen derivative of benzol and passing same in a vapor phase with steam through a mass of porous silica having a high order of catalytic activity.

3. The method of making carbolic acid which consists in passing steam and a monohalogen derivative of benzol in the vapor phase through a heated, porous catalyst, said catalyst being comprised of a porous silica having a high order of the catalytic activity.

4. The method of making carbolic acid by the interaction between steam and a monohalogen derivative of benzol in the vapor phase by sending the mixed vapors through a heated catalyst, comprised of silica gel.

5. The method of making carbolic acid by the interaction between steam and a monohalogen derivative of benzol in the vapor phase at atmospheric pressure by sending the mixed vapors through a heated, porous silica having a high order of catalytic activity.

6. The method of making carbolic acid which consists in passing steam and monochlorbenzol in the vapor phase through a heated, porous catalyst, said catalyst being comprised of a porous silica having a high order of catalytic activity.

7. The method of making carbolic acid which consists in passing mixed vapors of steam and monochlorbenzol through a heated, porous catalyst, said catalyst being comprised of a porous silica having a high order of catalytic activity.

STEWART JOSEPH LLOYD.
ABSALOM MASON KENNEDY.